United States Patent [19]

Mitani et al.

[11] Patent Number: 4,640,966
[45] Date of Patent: Feb. 3, 1987

[54] FLUOROOLEFIN COPOLYMER, PROCESS FOR PRODUCTION THEREOF AND COMPOSITION CONTAINING SAID COPOLYMER

[75] Inventors: Tomomasa Mitani, Izumi; Ichiro Mihata, Izumiohtsu, both of Japan

[73] Assignee: Dainippon Ink and Chemicals, Inc., Tokyo, Japan

[21] Appl. No.: 795,115

[22] Filed: Nov. 5, 1985

[30] Foreign Application Priority Data

Nov. 7, 1984 [JP] Japan ................... 59-234327
Dec. 18, 1984 [JP] Japan ................... 59-266831

[51] Int. Cl.$^4$ ................... C08F 214/24; C08F 214/26; C08F 214/28
[52] U.S. Cl. ................... 526/249; 526/247; 526/254; 526/255
[58] Field of Search ................ 526/247, 249, 254, 255

[56] References Cited

U.S. PATENT DOCUMENTS

| | | | |
|---|---|---|---|
| 2,599,640 | 6/1952 | Joyce | 526/249 |
| 2,836,582 | 5/1958 | Hoyt | 526/255 |
| 3,318,854 | 5/1967 | Honn et al. | 526/254 |
| 3,380,971 | 4/1968 | Chalmers et al. | 526/255 |
| 3,445,434 | 5/1969 | Stilmar | 526/255 |
| 3,822,228 | 7/1974 | Petrella et al. | 526/247 |
| 4,151,340 | 4/1979 | Ichimura et al. | 526/255 |

*Primary Examiner*—Harry Wong, Jr.
*Attorney, Agent, or Firm*—Sherman and Shalloway

[57] ABSTRACT

A fluoroolefin copolymer having an inherent viscosity of from 0.05 to 2.0 dl/g and composed of (I) 10 to 70 mole % of monomeric units derived from a fluoroolefin represented by the general formula

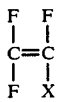

wherein X is H, Cl, F, $CF_3$, $OCF_3$ or $OC_3F_7$, (II) 5 to 60 mole % of monomeric units derived from a vinyl carboxylate represented by the general formula

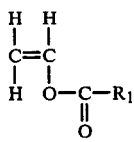

wherein $R_1$ represents an aliphatic, aromatic or alicyclic hydrocarbon group having 1 to 17 carbon atoms, (III) 5 to 70 mole % of monomeric units derived from a vinyl ether having an alkyl group with 1 to 8 carbon atoms, and (IV) 0 to 30 mole % of monomeric units derived from a hydroxyl-containing vinyl ether represented by the general formula

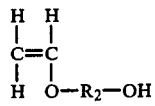

wherein $R_2$ represents an alkylene group having 1 to 6 carbon atoms.

11 Claims, No Drawings

FLUOROOLEFIN COPOLYMER, PROCESS FOR PRODUCTION THEREOF AND COMPOSITION CONTAINING SAID COPOLYMER

This invention relates to a fluoroolefin copolymer, a process for production thereof, and a composition containing the copolymer. More specifically, this invention relates to a fluoroolefin copolymer composed substantially of a fluoroolefin, a carboxylic acid vinyl ester and a vinyl ether, and to a process for producing the copolymer in high yields by utilizing the copolymerizability of the individual monomers. The invention also pertains to a composition comprising the copolymer and a solvent and optionally a curing agent.

Fluoroolefin polymers have found extensive use for their useful properties such as chemical resistance, heat resistance, abrasion resistance and non-tackiness. Because of their high melting point, they have the defect of requiring melting and baking at high temperatures in film formation. Furthermore, since they are insoluble in solvents, they can be used only in the form of an emulsion or dispersion and cannot be formulated into paints having good storage stability. In order to remedy these defects, attempts have been made heretofore to copolymerize the fluoroolefin with vinyl monomers. For example, Japanese Laid-Open Patent Publication No. 11915/1974 proposes a solvent-soluble coating composition comprising vinylidene chloride, hexafluoropropylene (HFP for short) and vinyl acetate. U.S. Pat. No. 4,151,340 proposes a solvent-soluble polymer composed of a fluoroolefin and cyclohexyl vinyl ether and having high rigidity. Cyclohexyl vinyl ether is a special monomer which is not commercially available in general and is expensive. U.S. Pat. No. 2,834,767 proposes a copolymer of a fluoroolefin with a vinyl ether which, however, gives only a soft film.

It is an object of this invention to provide fluoroolefin polymers free from the foregoing defects. The present inventors extensively worked for achieving this object, and found that a copolymer obtained by copolymerizing specific proportions of a fluoroolefin, a carboxylic acid vinyl ester, an alkyl-containing vinyl ether and a hydroxyl-containing vinyl ether is inexpensive and has high rigidity and solubility in solvents.

Thus, according to this invention, there is provided a fluoroolefin copolymer having an inherent viscosity of from 0.05 to 2.0 dl/g and composed of (I) 10 to 70 mole% of monomeric units derived from a fluoroolefin represented by the general formula

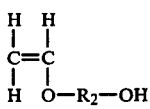   (A)

wherein X is H, Cl, F, CF$_3$, OCF$_3$ or OC$_3$F$_7$, (II) 5 to 60 mole% of monomeric units derived from a vinyl carboxylate represented by the general formula

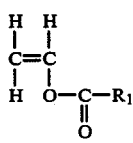   (B)

wherein R$_1$ represents an aliphatic, aromatic or alicyclic hydrocarbon group having 1 to 17 carbon atoms, (III) 5 to 70 mole% of monomeric units derived from a vinyl ether having an alkyl group with 1 to 8 carbon atoms, and (IV) 0 to 30 mole% of monomeric units derived from a hydroxyl-containing vinyl ether represented by the general formula

   (C)

wherein R$_2$ represents an alkylene group having 1 to 6 carbon atoms.

According to this invention, there is also provided a process for producing the aforesaid fluoroolefin copolymer, which comprises polymerizing the aforesaid component monomers in the presence of a radical initiator at a temperature of from −20° C. to 130° C.

The invention further provides a curable composition comprising the fluoroolefin copolymer and an organic solvent and optionally a curing agent.

Examples of the fluoroolefin of general formula (A) which is a source of the monomeric units (I) in the copolymer of this invention are tetrafluoroethylene, chlorotrifluoroethylene and hexafluoropropylene. The content of the monomeric units (I) in the copolymer is 10 to 70 mole%, preferably 20 to 60 mole%. If the content is less than 10 mole%, the characteristics of the fluoroolefin are not exhibited in the copolymer. If it exceeds 70 mole%, the adhesion of the copolymer to a substrate is poor.

Examples of the vinyl carboxylate of general formula (B) which is a source of the monomeric units (II) include vinyl acetate, vinyl propionate, vinyl butyrate, vinyl pivalate, vinyl caproate, vinyl Versatate (a vinyl ester of C$_9$–C$_{10}$ carboxylic acids), vinyl laurate, vinyl stearate, vinyl benzoate, vinyl p-t-butylbenzoate and vinyl salicylate. Vinyl Versatate and vinyl benzoate are especially preferred because the use of these in small amounts can lead to an increase in the hardness of a coated film from the copolymer. The content of the monomeric units (II) in the copolymer is 5 to 60 mole%, preferably 10 to 50 mole%. If it is less than 5 mole%, a coated film prepared from the copolymer has low rigidity and low hardness and remarkably gathers dust. If it exceeds 60 mole%, the copolymer forms a brittle coated film.

Examples of the vinyl ether having a C$_1$–C$_8$ alkyl group are methyl vinyl ether, ethyl vinyl ether, n-propyl vinyl ether, isopropyl vinyl ether, n-butyl vinyl ether, isobutyl vinyl ether, t-butyl vinyl ether, n-pentyl vinyl ether, n-hexyl vinyl ether, n-octyl vinyl ether, and 2-ethylhexyl vinyl ether. The content of the monomeric units (III) in the copolymer is 5 to 70 mol%, preferably 10 to 60 mole%. If it is less than 5 mole%, the resulting copolymer is undesirably in a low yield. If it exceeds 70 mole%, the copolymer has a decreased fluorine content and its characteristics as a fluorine polymer are degraded.

Examples of the hydroxyl-containing vinyl ether of general formula (C) which is a source of the monomeric units (IV) are hydroxymethyl vinyl ether, hydroxyethyl vinyl ether, 3-hydroxypropyl vinyl ether, 2-hydroxypropyl vinyl ether, 4-hydroxybutyl vinyl ether, 3-hydroxybutyl vinyl ether, 2-hydroxy-2-methylpropyl vinyl ether, 5-hydroxypentyl vinyl ether and 6-hydroxyhexyl vinyl ether. The content of the monomeric units (IV) in the copolymer is 0 to 30 mole%, preferably 5 to 30 mole%, more preferably 7 to 20 mole%. If it is less than 5 mole%, the curability of the copolymer with the curing agent is insufficient. If it exceeds 30 mole%, the copolymer has a reduced solubility in solvents, and a paint prepared by mixing the copolymer with a solvent and a curing agent has so short a gellation time that its applicability decreases.

The copolymer of this invention may contain other monomeric units derived from other copolymerizable vinyl monomers so long as the inclusion of the other units does not impair the intended effects of the invention. Examples of such other vinyl monomers include olefins such as ethylene, propylene and butene-1; vinyl halides such as vinyl chloride, vinylidene chloride, vinyl fluoride and vinylidene fluoride; acrylic acid esters having alkyl of 1 to 8 carbon atoms; methacrylic acid esters having alkyl of 1 to 8 carbon atoms. The suitable content of the other vinyl monomer units is less than 30 mole%.

The copolymer of this invention has an inherent viscosity, determined in tetrahydrofuran at 25° C., of 0.05 to 2.0 dl/g, preferably 0.2 to 1.0 dl/g. If the inherent viscosity is less than 0.05 dl/g, the copolymer has low mechanical strength. If it exceeds 2.0 dl/g, a solution of the copolymer has an excessively high viscosity so that the application of a coating prepared from it becomes difficult. When the copolymer of this invention contains a hydroxyl group, it preferably has a hydroxyl value of 20 to 200 mg KOH/g, especially 30 to 120 mg KOH/g. If its hydroxyl value is less than 20 mg KOH/g, the copolymer has a long curing time in the presence of a curing agent, and the mechanical strength of a film from the copolymer does not increase to a high level. On the other hand, if its hydroxyl value exceeds 200 mg KOH/g, the curing time is excessively short, and therefore the applicability of a composition obtained from it is poor. Moreover, a cured product of the copolymer is brittle.

The copolymer of this invention can be produced by mixing 10 to 70 mole% of the fluoroolefin of general formula (A), 5 to 60 mole% of the vinyl carboxylate of general formula (B), 5 to 70 mole% of the alkyl-containing vinyl ether and up to 30 mole% of the hydroxyl-containing vinyl ether of general formula (C), and polymerizing the mixture in the presence of a radical initiator by a batchwise, semi-continuous or continuous operation in accordance with a known technique such as bulk polymerization, solution polymerization, suspension polymerization or emulsion polymerization.

The radical initiator used in this invention has a moderate decomposition speed at the copolymerization reaction temperature. Examples include diacyl peroxides such as acetyl peroxide and benzoyl peroxide; ketone peroxides such as methyl ethyl ketone peroxide and cyclohexanone peroxide; hydroperoxides such as hydrogen peroxide, t-butyl hydroperoxide and cumene hydroperoxide; dialkyl peroxides such as di-t-butyl peroxide and dicumyl peroxide; alkyl peroxyesters such as t-butyl peroxyacetate and t-butyl peroxypivalate; azo compounds such as azobisisobutyronitrile and azobisisovaleronitrile; and persulfates such as ammonium persulfate and potassium persulfate. As required, an inorganic reducing agent such as sodium hydrogen sulfite and sodium pyrosulfite, or an organic reducing agent such as cobalt naphthenate and dimethylaniline may be used in the copolymerization. The suitable amount of the radical initiator is 0.01 to 10% by weight based on the total weight of the monomers, and the suitable weight of the reducing agent is 0.01 to 5% by weight on the same basis.

The copolymerization is carried out usually at a temperature of from −20° C. to 130° C. and a pressure of 1 to 100 kg/cm$^2$, preferably 5 to 60 kg/cm$^2$.

An aromatic hydrocarbon such as toluene, xylene and ethylbenzene, a ketone such as acetone, methyl ethyl ketone and methyl isobutyl ketone, an acetic acid ester such as ethyl acetate, propyl acetate, butyl acetate and isobutyl acetate, and an alcohol such as isopropanol, n-butanol and ethyl Cellosolve may be added to the copolymer of this invention. The mixing ratio of the copolymer to the solvent is suitably from 95:5 to 5:95, preferably from 90:10 to 10:90, by weight.

Furthermore, a curing agent may be added to the copolymer of this invention.

Where the copolymer of this invention contains the hydroxyl-containing vinyl ether units, the hydroxyl groups therein constitute crosslinking sites. Hence, by incorporating a curing agent capable of reacting with the hydroxyl groups, the copolymer can be cured at room temperature or at 50° to 300° C., preferably 60° to 250° C. Typical examples of the curing agent are aminoplasts, polyisocyanate compounds, blocked polyisocyanate compounds, polybasic acids and polybasic acid anhydrides.

Typical examples of the aminoplasts are condensates formed between amino group-containing compounds such as melamine, urea, acetoguanamine or benzoguanamine and aldehyde compounds such as formaldehyde, paraformaldehyde, acetaldehyde or glyoxal by known conventional methods, and products obtained by etherifying these condensates with alcohols. Those partially or completely etherified with C$_1$–C$_4$ alcohols are preferred. Specific examples of the aminoplasts include hexamethyl etherified methylolmelamine, hexabutyl etherified methylolmelamine, methyl-butyl mixed etherified methylolmelamine, methyl etherified methylolmelamine, butyl etherified methylolmelamine and isobutyl etherified methylolmelamine. Particularly, from the viewpoint of the compatibility with the copolymer of this invention, the use of methyl etherified methylolmelamine is desirable.

Typical examples of the polyisocyanate compounds include aliphatic diisocyanates such as hexamethylene diisocyanate, trimethylhexamethylene diisocyanate and tetramethylene diisocyanate; alicyclic diisocyanates such as xylylene diisocyanate, methylcyclohexane-2,4-(or 2,6-)diisocyanate, isophorone diisocyanate and 4,4'-methylene-bis(cyclohexylisocyante); adducts of the aforesaid diisocyanates with polyhydric alcohols or carbon dioxide gas; polyisocyanates containing a biuret linkage obtained by reacting the aforesaid diisocyanates with water; and polyisocyanates having an isocyanurate ring obtained by polymerizing the aforesaid diisocyanates.

Examples of the blocked polyisocyanates may be those obtained by blocking the aforesaid polyisocyanate compounds with known conventional blocking agents typified by alcohols, compounds having phenolic hydroxyl groups, oximes, acetoacetic acid esters and N-monosubstituted carboxylic acid amides.

Typical examples of the polybasic acids are acrylic resins having at least 2 carboxyl groups per molecule; polyester resins having at least 2 carboxyl groups per molecule, and aromatic polybasic acids such as trimellitic acid and pyromellitic acid.

Typical examples of the polybasic acid anhydrides are succinic anhydride, trimellitic anhydride, pyromellitic anhydride, and vinyl polymers having a carboxylic acid anhydride group.

In the preparation of a curable composition, the ratio of the copolymer to the curing agent varies depending upon the type of the curing agent, and is particularly preferable as follows: When the curing agent is the aminoplast, the weight ratio of the copolymer to the curing agent is from 50:50 to 99:1. When the curing agent is the polyisocyanate compound, the OH/NCO equivalent ratio is from 1:0.2 to 1:3. When the curing agent is the blocked polyisocyanate, the OH/blocked NCO equivalent ratio is from 1:0.2 to 1:3. When the curing agent is the polybasic acid, the OH/COOH equivalent ratio is from 1:0.2 to 1:2. When the curing agent is the polybasic acid anhydride, the OH/carboxylic acid anhydride group equivalent ratio is from 1:0.2 to 1:2.

Furthermore, in the preparation of the curable composition, known conventional curing catalysts may be added depending upon the type of the curing agent used. Typical examples of such a curing catalyst are acidic phosphoric acid esters, p-toluenesulfonic acid, naphthalenedisulfonic acid, and amine salts of these acids for the aminoplasts as curing agents, and dibutyltin diacetate, dibutyltin dioctoate, dibutyltin dilaurate and tin octoate for the polyisocyanate compounds or blocked polyisocyanate compounds as the curing agent.

As required, the above composition may include pigments, resins, solvents, leveling agents, antiflooding agents, antioxidants, ultraviolet absorbers, etc.

The copolymer of this invention is soluble in organic solvents, and an organic solvent solution of the copolymer forms a film having excellent weatherability, water repellency, non-tackiness, soiling resistance and chemical resistance upon evaporation of the solvent at room temperature.

In particular, the copolymer of this invention which has hydroxyl groups forms a film having better properties when it is cured with a curing agent.

The copolymer of this invention shows excellent utility in surface coating agents for steel materials, wooden products, ceramic products, glass products and plastic products, water-repellent and oil-repellent agents for textile finishing, non-tacky coating agents, sliding bearings, a sheath material for optical fibers, solar collectors and physical or chemical materials for medical therapy. The copolymer of this invention is also useful as baking paints for metals, paints for external finishing of buildings, paints for roofs of buildings in districts where snowfall is heavy, ship paints, automobile paints, and aircraft paints.

The following examples illustrate the present invention more specifically.

EXAMPLES 1-7 AND COMPARATIVE EXAMPLE 1

In each run, a 100 ml stainless steel pressure tube was charged with 50 cc of methyl isobutyl ketone, 0.5 g of tert.-butyl peroxypivalate (TBP for short), ethyl vinyl ether (EVE for short) in the amount indicated in Table 1, and the vinyl carboxylate having a $C_8$ alkyl group (Veova-9, a tradename for a product of Shell Chemical Co.) or vinyl benzoate (BzVE for short) in the amount indicated in Table 1. Then, the reaction tube was cooled to $-70°$ C. by dry ice-methanol. Nitrogen gas was blown into the tube to remove air. Then, a predetermined amount of liquefied hexafluoropropylene (HFP for short) or chlorotrifluoroethylene (CTFE for short) was introduced into the tube, and the tube was sealed up.

The reaction tube was put in a water bath heated at 60° C. and the mixture was reacted for 16 hours under shaking. The reaction mixture in the tube was precipitated from 10 times its amount of methanol. The precipitate was dried for one day at 80° C., and its yield was measured. The polymer was dissolved in 100 cc of acetone, and purified by precipitating it from 1 liter of methanol, followed by drying. The fluorine content, NMR, inherent viscosity and glass transition temperature of the product were measured.

As a result of its NMR measurement (by Model JNM-MH60 supplied by Nippon Electronics Co., Ltd.; internal standard, tetramethylsilane), the proton of

assigned to ethyl vinyl ether appeared at 3.9–4.6 ppm, and the protons of

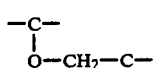

appeared at 3.2–3.9 ppm. The proton of

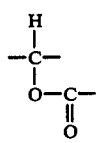

assigned to Veova-9 also appeared at 4.6–5.9 ppm.

Ethyl vinyl ether/Veova-9 (mole ratio) =

$$\frac{\text{Peak area of } (3.2-3.9) + (3.9-4.6)}{3} \bigg/ \frac{\text{Peak area of } (4.6-5.9)}{1}$$

The fluorine content was measured by fluorine colorimetry in accordance with the alizarin complexone method.

The inherent viscosity was determined by an Ubbelohde's viscometer for a 1% tetrahydrofuran solution of the polymer at 25° C.

The glass transition point was measured by TGA-DSC.

TABLE 1

| | | Example 1 | Example 2 | Example 3 | Example 4 | Example 5 | Example 6 | Example 7 | Comp. Example 1 |
|---|---|---|---|---|---|---|---|---|---|
| Monomers charged [g (mole %)] | HFP | 13.5(30) | 14.0(35) | 18.5(41) | — | 13.5(30) | 22.5(50) | 15.6(30) | 30.0(50) |
| | CTFE | — | — | — | 11.8(35) | — | — | — | — |
| | EVE | 10.8(50) | 6.7(35) | 11.2(52) | 8.4(40) | 10.8(50) | 6.5(30) | 15.1(60) | 14.4(50) |
| | Veova-9 | 11.9(20) | 15.8(30) | 4.2(7) | 14.4(25) | — | 11.9(20) | 6.9(10) | — |
| | BzVE | — | — | — | — | 8.9(20) | — | — | — |
| Amount of polymer (g) | | 34.0 | 33.2 | 31.9 | 31.8 | 31.2 | 31.9 | 30.5 | 41.6 |
| Yield of the polymer (%) | | 95.6 | 91.0 | 94.1 | 91.9 | 94.0 | 78.0 | 81.1 | 93.7 |
| Composition of the polymer (mole %) | HFP | 27 | 32 | 43 | — | 28 | 40 | 38 | 48 |
| | CTFE | — | — | — | 33 | — | — | — | — |
| | EVE | 52 | 35 | 50 | 39 | 51 | 36 | 50 | 52 |
| | Veova-9 | 21 | 33 | 7 | 28 | — | 24 | 12 | — |
| | BzVE | — | — | — | — | 21 | — | — | — |
| Conversions to the polymer (%)*1 | HFP | 85.3 | 82.2 | 97.3 | — | 88.4 | 64.0 | 94.2 | 91.3 |
| | CTFE | — | — | — | 84.9 | — | — | — | — |
| | VE | 98.5 | 90.2 | 89.7 | 87.2 | 96.6 | 95.4 | 61.6 | 98.6 |
| | Veova-9 | 99.4 | 99.1 | 92.1 | 99.1 | — | 95.0 | 94.2 | — |
| | BzVE | — | — | — | — | 98.9 | — | — | — |
| Inherent viscosity (dl/g) | | 0.23 | 0.17 | 0.29 | 0.25 | 0.26 | 0.13 | 0.19 | 0.24 |
| Glass transition temp. (°C.) | | 12 | 17 | 8 | 19 | 27 | 23 | 10 | −2 |

Note to Table 1.
*1 That portion of the charged monomer which was converted to the polymer.

The above polymers were all soluble in organic solvents such as ethyl acetate, butyl acetate, acetone, methyl ethyl ketone, toluene, xylene and tetrahydrofuran.

Thirty grams of each of the polymers obtained in Examples 1, 3 and 5 and Comparative Example 1 was dissolved in a mixed solvent composed of 15 g of toluene and 15 g of methyl isobutyl ketone to obtain a colorless transparent solution. Ten grams of titanium oxide (Tipaque R-820, a product of Ishihara Sangyo Kaisha Ltd.) was added, and the mixture was ball-milled for 24 hours to prepare a white paint. The paint was coated by an applicator on a steel sheet (JIS G-3141) degreased with methyl ethyl ketone, and dried for 4 hours at 110° C. to form a coated film having a thickness of 30 to 40 microns. The properties of the coated film were measured, and are shown in Table 2.

TABLE 2

| | | Example 1 | Example 3 | Example 5 | Comparative Example 1 |
|---|---|---|---|---|---|
| Hardness | Pencil | H | F | 2H | 2B |
| Adhesion | Crosscut | 100/100 | 95/100/ 100/100 | 50/100 | |
| Chemical resistance | 5% NaOH, 24 hrs., spot test | ◎ | ◎ | ◎ | ◎ |
| Water repellency | Repellency of water | ◎ | ◎ | ◎ | ◎ |
| Soiling resistance | Lipstick, washing with soap solution | ◎ | ◎ | ◎ | ◎ |
| Weatherability | Sunshine Weatherometer, 1500 hrs. | ◎ | ◎ | ○ | ◎ |
| Tackiness | Coating of carbon black; washing with soap solution 24 hrs. later | ◎ | ○ | ◎ | X |

Standards of evaluation
◎: No change (no adhesion)
○: Very slight change (very slight adhesion)
X: Completely changed (adhered)
(The parenthesized standards apply to tackiness.)

EXAMPLE 8

A 2-liter electromagnetically stirred autoclave was charged with 525 g of methyl isobutyl ketone, 92 g of Veova-9 and 231 g of isobutyl vinyl ether, and was purged with nitrogen under 10 kg/cm². This operation was repeated, and then 277 g of liquefied HFP under nitrogen pressure was charged into the autoclave.

The proportion of the monomer charged was 40 mole% for HFP, 50 mole% for isobutyl vinyl ether and 10 mole% for Veova-9.

The autoclave was then heated to 60° C., and a solution of 10 g of TBP in 75 g of methyl isobutyl ketone was added dropwise for 6 hours. After the addition, the temperature was raised to 70° C., and the mixture was maintained at this temperature for 2 hours. The pressure in the initial stage of the reaction was 6.8 kg/cm², but was 1.0 kg/cm² at the end of the reaction. The nonvolatile content of the reaction mixture after the reaction was 47.9%. This means that the amount of the polymer formed was 575 g, and therefore, the yield of the polymer based on the total weight of the monomers was 95.8%.

The resulting polymer was found to consist of 39 mole% of HFP, 51 mole% of isobutyl vinyl ether and 10 mole% of Veova-9 from the fluorine content and the NMR spectrum. The conversions of these monomers to the polymer were calculated as 93.9%, 97.4%, and 97.8%, respectively. The polymer had an inherent viscosity of 0.19 dl/g, and a glass transition temperature of 10° C.

EXAMPLE 9

The same autoclave as used in Example 8 was charged with 525 g of methyl isobutyl ketone, and then purged twice with nitrogen under 10 kg/cm². A 1-liter pressure vessel was cooled to −30° C. with dry ice-methanol. From a tetrafluoroethylene (TFE for short) bomb, an excess of liquefied TFE was taken into the pressure vessel through a pipe. The pressure vessel was then heated to introduce 244 g of TFE into the autoclave. When the autoclave was heated to 60° C. with stirring, the pressure reached 34 kg/cm². A mixture of 176 g of EVE and 180 g of BzVE was added dropwise from the monomer tank, and a mixture of 10 g of TBP and 75 g of methyl isobutyl ketone was added dropwise from a catalyst tank, uniformly over the course of 6 hours.

The proportion of the monomers charged was 40 mole% for TFE, 40 mole% for EVE and 20 mole% for BzVE.

With the progress of the polymerization, the pressure dropped, and reached 3 kg/cm$^2$ after the lapse of 10 hours. The non-volatile content of the reaction mixture after the reaction was 46.7%. This means that the amount of the polymer formed was 560 g, and its yield based on the entire monomers was 93.3%.

From the fluorine content and NMR spectrum as in Example 1, the resulting polymer was found to consist of 39 mole% of TFE, 41 mole% of EVE and 20 mole% of BzVE. The conversions of the individual monomers to the polymer were calculated as 92.2%, 96.6%, and 94.4%, respectively. The polymer had an inherent viscosity of 0.15 dl/g, and a glass transition temperature of 22° C.

The properties of coated films prepared as in Example 1 from the polymers obtained in Examples 8 and 9 were measured, and are shown in Table 3 below.

TABLE 3

|  | Example 8 | Example 9 |
|---|---|---|
| Hardness | F | H |
| Adhesion | 100/100 | 100/100 |
| Chemical resistance | ◎ | ◎ |
| Water repellency | ◎ | ◎ |
| Soiling resistance | ◎ | ◎ |
| Weatherability | ◎ | ○ |
| Tackiness | ◎ | ◎ |

EXAMPLES 10–14 AND COMPARATIVE EXAMPLES 2–3

In each run, a 100 ml stainless steel pressure tube was charged with 50 cc of methyl isobutyl ketone (MIBK for short), 0.5 g of TBP, EVE in the amount indicated in Table 4, 4-hydroxybutyl vinyl ether (HBVE for short) in the amount indicated in Table 4, and Veova-9 (VV-9 for short) or·BzVE in the amount indicated in Table 4, and cooled to −70° C. on a dry ice-methanol bath. Nitrogen gas was blown into the pressure tube to remove oxygen from it. HFP, CTFE or TFE was introduced into the tube as in aforesaid examples, and the tube was sealed up. The sealed pressure tube was put in a water bath kept at 60° C., and the reaction was carried out for 16 hours under shaking. The reaction mixture in the tube was poured into 10 times its amount of methanol. The precipitate was dried at 80° C. for 12 hours, and the yield of the resulting polymer was measured. The polymer was dissolved in 100 ml of acetone and then re-precipitated from 1 liter of methanol to purify it. The purified polymer was dried, and its fluorine content, NMR, inherent viscosity and glass transition temperature were measured as in Example 1.

The NMR measurement showed that protons of

assigned to the alkyl vinyl ether (b mole%) and the hydroxybutyl vinyl ether (c mole%) appeared at 3.9 to 4.6 ppm, and protons of

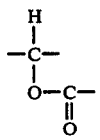

assigned to the vinyl carboxylate (d mole%) appeared at 4.6 to 5.9 ppm.

Hence, the mole ratio of $$(b+c)/d = [\text{peak area of } (3.9-4.6)]/[\text{peak area of } (4.6-5.9)] \quad (1)$$

$$c + d = 100 - (a + b) \quad (2)$$

(a represents the mole% of HFP, CTFE or TFE)

From (1), $$d = (b + c) \times \frac{[\text{peak area of } (4.6-5.9)]}{[\text{peak area of } (3.9-4.6)]}$$

When d is substituted for d in equation (2), the following equation is given.

$$c + (b + c) \frac{[\text{peak area of } (4.6-5.9)]}{[\text{peak area of } (3.9-4.6)]} = 100 - (a + b)$$

From the above equation, c (the mole% of hydroxybutyl vinyl ether) and d (the mole% of the vinyl carboxylate) can be obtained.

The hydroxyl values of the resulting copolymers were measured by the acetylation method using acetic anhydride, and the mole% of hydroxybutyl vinyl ether was calculated on the basis of the hydroxyl value.

The results are shown in Table 4.

TABLE 4

|  |  | Example |  |  |  |  | Comp. Example |  |
|---|---|---|---|---|---|---|---|---|
|  |  | 10 | 11 | 12 | 13 | 14 | 2 | 3 |
| Monomers charged [g (mole %)] | HFP | 18.1(40.1) | 12.9(29.9) | 20.1(40.0) |  |  | 15.2(35.1) | 25.9(45.0) |
|  | CTFE |  |  |  | 15.6(40.0) |  |  |  |
|  | TFE |  |  |  |  | 16.1(40.1) |  |  |
|  | EVE | 6.5(30.0) | 5.2(25.1) | 7.2(29.8) | 7.2(29.9) | 8.7(30.1) | 6.6(31.8) | 10.2(36.9) |
|  | HBVE | 3.5(10.0) | 5.0(15.0) | 7.8(20.1) | 3.9(10.0) | 9.3(19.9) | 1.0(3.0) | 6.7(15.1) |
|  | VV-9 | 11.9(19.9) | 17.0(30.0) |  | 13.3(20.1) |  | 17.2(30.1) | 2.3(3.0) |
|  | BzVE |  |  | 5.0(10.1) |  | 5.9(9.9) |  |  |
| Amount of polymer (g) |  | 36.7 | 37.3 | 38.0 | 36.9 | 36.2 | 37.6 | 42.8 |
| Yield of the polymer (%) |  | 91.8 | 93.5 | 94.8 | 92.2 | 90.5 | 93.8 | 94.9 |
| Composition of the polymer (mole %) | HFP | 37.7 | 30.0 | 39.8 |  |  | 35.4 | 46.3 |
|  | CTFE |  |  |  | 40.7 |  |  |  |
|  | TFE |  |  |  |  | 41.1 |  |  |
|  | EVE | 31.5 | 25.0 | 30.2 | 30.7 | 29.1 | 31.0 | 35.8 |
|  | HBVE | 9.9 | 14.6 | 19.8 | 9.5 | 19.3 | 2.6 | 14.8 |

TABLE 4-continued

|  |  | Example |  |  |  |  | Comp. Example |  |
|---|---|---|---|---|---|---|---|---|
|  |  | 10 | 11 | 12 | 13 | 14 | 2 | 3 |
| Conversions to the monomers (%) | VV-9 | 20.9 | 30.4 |  | 19.1 |  | 31.0 | 3.1 |
|  | BzVE |  |  | 10.2 |  | 10.5 |  |  |
|  | HFP | 86.7 | 93.0 | 94.5 |  |  | 94.1 | 96.9 |
|  | CTFE |  |  |  | 94.9 |  |  |  |
|  | TFE |  |  |  |  | 92.5 |  |  |
|  | EVE | 96.9 | 92.3 | 95.8 | 95.8 | 87.4 | 90.9 | 91.2 |
|  | HBVE | 91.4 | 90.0 | 93.6 | 87.2 | 87.1 | 80.0 | 92.5 |
|  | VV-9 | 96.6 | 94.1 |  | 88.9 |  | 95.9 | 95.7 |
|  | BzVE |  |  | 96.0 |  | 94.9 |  |  |
| Inherent viscosity (dl/g) |  | 0.27 | 0.22 | 0.31 | 0.26 | 0.19 | 0.17 | 0.35 |
| Hydroxyl value (mg KOH/g) |  | 44.0 | 60.2 | 90.5 | 47.1 | 110.4 | 10.3 | 70.9 |
| Glass transition temp. (°C.) |  | 14 | 25 | 24 | 15 | 21 | 25 | 1 |
| Fluorine content (wt. %) |  | 32.5 | 24.4 | 38.0 | 19.6 | 31.2 | 28.9 | 44.5 |

The above copolymers were all soluble in organic solvents such as ethyl acetate, butyl acetate, acetone, methyl ethyl ketone, tetrahydrofuran, carbon tetrachloride, toluene and xylene.

Fifty grams of each of the polymers obtained in Examples 10 to 14 and Comparative Examples 2 and 3 was dissolved in a mixed solvent composed of 25 g of toluene and 25 g of methyl isobutyl ketone to form a colorless transparent solution. To the solution was added 27 g of titanium dioxide (Tipaque CR-90, a product of Ishihara Sangyo Kaisha Ltd.), and the mixture was ball-milled for 24 hours to form a white mill base. An adduct of 3 moles of hexamethylene diisocyanate and 1 mole of trimethylolpropane was added so that the hydroxyl groups of the polymer become equal in equivalent weight to the isocyanate groups. The mixture was coated by an applicator on a steel plate (JIS G-3141) degreased with methyl ethyl ketone, and baked at 80° C. for 30 minutes. The coated film was left to stand for 2 days, and then tested for the various properties. The thickness of the coated film was 35 to 40 microns. The results are shown in Table 5.

TABLE 5

|  | Example |  |  |  |  | Comp. Example |  |
|---|---|---|---|---|---|---|---|
| Film properties | 10 | 11 | 12 | 13 | 14 | 2 | 3 |
| Gloss (60° gloss) | 91 | 93 | 92 | 88 | 87 | 91 | 89 |
| Hardness (pencil) | H | 2H | 2H | H | 2H | 2H | 2B |
| Adhesion (crosscut; peeling of adhesive tape) | 100/100 | 100/100 | 100/100 | 100/100 | 100/100 | 100/100 | 100/100 |
| Chemical resistance (5% NaOH, 24 hrs. spot test) | ◎ | ◎ | ◎ | ◎ | ◎ | ○ | ◎ |
| Thinner resistance (number of lacquer thinner rubbings/micron)*1 | >5 | 4 | >5 | >5 | >5 | 0.2 | 3 |
| Resistance to soiling by tobacco tar (25° C. × 2 hrs., soap solution washing) | ◎ | ◎ | ◎ | ◎ | ◎ | ◎ | ◎ |
| Lipstick (25° C. × 2 hrs., soap solution washing) | ◎ | ◎ | ◎ | ◎ | ◎ | ◎ | ◎ |
| Ink of the felt pen (25° C. × 2 hrs., wiping with solvent)*2 | ◎ | ◎ | ◎ | ◎ | ◎ | X | Δ |
| Water repellency*3 | ◎ | ◎ | ◎ | ◎ | ◎ | ◎ | ◎ |
| Gasoline resistance (immersion for 2 hours in high-octane gasoline) | ◎ | ◎ | ◎ | ◎ | ◎ | X | ◎ |
| Weatherability (gloss retention %) Sunshine Weatherometer (3,000 hrs.) | 95 | 96 | 95 | 93 | 92 | 87 | 82 |
| Outdoor exposure (3 years at Miyazaki, Japan) | 93 | 93 | 93 | 91 | 91 | 85 | 73 |

Note to Table 5.
*1Thinner resistance
The number of rubbings of the coated film was measured by a rubbing tester (load 3 kg) using a lacquer thinner composed of toluene, ethyl acetate, MIBK and butanol in a ratio of 50:25:20:5. The measured value was calculated for each micron of the thickness of the coated film. The larger the value, the better the thinner resistance, and the smaller the value, the worse the thinner resistance.
*2Soiling resistance test using a felt pen
A mixture of 50% by weight of petroleum benzine and 50% by weight of ethanol was used as a wiping solvent.
*3Water repellency test
The coated film was exposed for 500 hours to a Sunshine Weatherometer, and then immersed for 1 hour in 50% soap solution. Then, the sample was pulled up, and the repellency of water was evaluated.
Standards of evaluation
(1) Resistance to soiling by tobacco tar, resistance to soiling by lipstick and resistance to soiling by the ink of a felt pen
◎: No trace at all
○ : Very slight trace.
Δ: Considerable trace
X: Complete remaining of a trace
(2) Water repellency
◎: Repelled well
○ : Repelled relatively well
Δ: Did not repel so much
X: Did not at all repel
(3) Gasoline resistance
◎: No discoloration or softening
○ : Some discoloration or softening
Δ: Considerable discoloration or softening
X: Heavy discoloration or softening The coated films obtained in Examples 10 to 14 showed good properties, whereas the coated film of Comparative Example 2 had inferior solvent resistance. The coated film of Comparative Example 3 was too soft, and gathered dust after outdoor exposure and showed poor retention of gloss.

EXAMPLE 15

A mixture of 50 g of the copolymer obtained in Example 10, 25 g of methyl isobutyl ketone, 25 g of xylene and 24.8 g of titanium dioxide (Tipaque CR-90) was ball-milled for 24 hours to form a white mill base. 13.9 g of a blocked polyisocyanate obtained by blocking a hexamethylene diisocyanate/trimethylolpropane adduct (3:1 by mole) with methyl ethyl ketoxime was added to the mill base so that the hydroxyl groups of the polymer were equal in equivalent weight to the blocked isocyanate group to form a white paint. The paint was applied to a steel plate in the same way as in Example 10, and heated at 170° C. for 30 minutes to obtain a cured coated film. The properties of the coated film were tested in the same way as in the foregoing Examples, and are shown in Table 6.

EXAMPLE 16

A mixture composed of 50 g of the copolymer obtained in Example 10, 20 g of methyl isobutyl ketone, 20 g of xylene, 10 g of n-butanol and 30.6 g of "Tipaque CR-90" was ball-milled for 24 hours to prepare a white mill base. To the mill base were added 21.4 g of hexamethoxymethylmelamine and 0.7 g of p-toluenesulfonic acid to obtain a white paint. As in Example 10, the paint was applied to a steel plate, and heated at 140° C. for 30 minutes to obtain a cured coated film. The properties of the coated film were tested in the same way as in the foregoing example, and are shown in Table 6.

TABLE 6

| Film properties | Example 15 | Example 16 |
|---|---|---|
| Gloss (60° gloss) | 88 | 87 |
| Hardness (pencil) | H | 2H |
| Adhesion (crosscut; peeling of adhesive tape) | 100/100 | 100/100 |
| Chemical resistance (5% NaOH, 24 hrs. spot test) | ◎ | ◎ |
| Thinner resistance (number of lacquer thinner rubbings/micron) | >5 ◎ | >5 ◎ |
| Resistance to soiling by tobacco tar | ◎ | ◎ |
| (25° C. × 2 hrs., soap solution washing) Lipstick | ◎ | ◎ |
| (25° C. × 2 hrs., soap solution washing) Ink of the felt pen | ◎ | ◎ |
| (25° C. × 2 hrs., wiping with solvent) Water repellency | ◎ | ◎ |
| Gasoline resistance (immersion for 2 hours in high-octane gasoline) | | |
| Weatherability (gloss retention %) Sunshine Weatherometer (3,000 hrs.) | 95 | 93 |
| Outdoor exposure (3 years at Miyazaki, Japan) | 93 | 91 |

EXAMPLES 17-21

Copolymers having the compositions shown in Table 7 were obtained by the same polymerization and after-treatment as in Example 10.

In each run, a white mill base was prepared from the copolymer in the same way as in Example 10, and an adduct of 3 moles of hexamethylene diisocyanate with 1 mole of trimethylolpropane was added so that the hydroxyl groups of the copolymer were equal in equivalent weight to the isocyanate groups to prepare a white paint. A cured coated film was formed from the paint, and tested, in the same way as in Example 10. The results are shown in Table 8.

EXAMPLE 22

A fine powder of pyromellitic anhydride was added to the white mill base obtained in Example 17 so that the equivalent ratio of the hydroxyl groups of the copolymer to the carboxylic acid anhydride group became 1:0.5 to form a white paint. The paint was coated on a steel plate in the same way as in Example 10, and heated at 220° C. for 30 minutes to form a cured coated film. The properties of the coated film were measured, and the results are shown in Table 8.

TABLE 7

| | | Example 17 | Example 18 | Example 19 | Example 20 | Example 21 |
|---|---|---|---|---|---|---|
| Monomer composition [g (mole %)] | HFP | 14.7(33.5) | 13.2(31.4) | 16.3(36.9) | 15.0(34.6) | 12.2(32.9) |
| | n-propyl vinyl ether | 5.3(21.1) | | | | |
| | n-Butyl vinyl ether | | 6.5(23.2) | | | |
| | t-Butyl vinyl ether | | | 8.3(28.1) | | |
| | n-Hexyl vinyl ether | | | | 8.0(21.7) | |
| | 2-Ethylhexyl vinyl ether | | | | | 7.3(18.9) |
| | 2-Hydroxyethyl vinyl ether | 4.0(15.4) | | | | 3.3(15.6) |
| | 3-Hydroxypropyl vinyl ether | | 4.3(15.2) | | | |
| | 5-Hydroxypentyl vinyl ether | | | 4.6(12.0) | | |
| | 6-Hydroxyhexyl vinyl ether | | | | 7.1(17.1) | |
| | VV-9 | 16.1(30.0) | 10.3(20.0) | | | |
| | Veova-10* | | 5.7(10.2) | | | |
| | Vinyl pivalate | | | 6.0(15.9) | 9.8(26.6) | |
| | Vinyl laurate | | | 4.7(7.1) | | |
| | Vinyl stearate | | | | | 10.2(13.5) |
| | BzVE | | | | | 7.0(19.1) |
| Amount of the polymer (g) | | 36.8 | 36.5 | 36.9 | 36.9 | 36.2 |
| Total polymer yield (%) | | 91.2 | 91.3 | 92.5 | 91.0 | 91.3 |
| Composition of the polymer (mole %) | HFP | 35.0 | 32.1 | 37.0 | 35.0 | 32.5 |
| | n-Propyl vinyl ether | 21.0 | | | | |
| | n-Butyl vinyl ether | | 23.0 | | | |
| | t-Butyl vinyl ether | | | 28.0 | | |
| | n-Hexyl vinyl ether | | | | 21.5 | |
| | 2-Ethylhexyl vinyl ether | | | | | 18.7 |
| | 2-Hydroxyethyl vinyl ether | 15.2 | | | | 15.4 |
| | 3-Hydroxypropyl vinyl ether | | 15.0 | | | |
| | 5-Hydroxypentyl vinyl ether | | | 12.1 | | |

TABLE 7-continued

| | Example | | | | |
|---|---|---|---|---|---|
| | 17 | 18 | 19 | 20 | 21 |
| 6-Hydroxyhexyl vinyl ether | | | | 17.0 | |
| VV-9 | 28.8 | 19.9 | | | |
| Veova-10* | | 10.0 | | | |
| Vinyl pivalate | | | 15.7 | 26.5 | |
| Vinyl laurate | | | 7.2 | | |
| Vinyl stearate | | | | | 13.4 |
| BzVE | | | | | 20.0 |
| Inherent viscosity (dl/g) | 0.26 | 0.20 | 0.21 | 0.23 | 0.19 |
| Hydroxyl value (mg KOH/g) | 62.3 | 57.2 | 48.8 | 66.6 | 53.1 |
| Glass transition temperature (°C.) | 15 | 10 | 30 | 17 | 11 |
| Fluorine content (wt. %) | 29.1 | 24.9 | 30.3 | 27.9 | 22.8 |

TABLE 8

| | Example | | | | | |
|---|---|---|---|---|---|---|
| Film properties | 17 | 18 | 19 | 20 | 21 | 22 |
| Gloss (60° gloss) | 90 | 91 | 87 | 89 | 91 | 87 |
| Hardness (pencil) | 2H | H | 2H | 2H | H | 2H |
| Adhesion (crosscut; peeling of adhesive tape) | 100/100 | 100/100 | 100/100 | 100/100 | 100/100 | 100/100 |
| Chemical resistance (5% NaOH, 24 hrs. spot test) | ◎ | ◎ | ◎ | ◎ | ◎ | ◎ |
| Thinner resistance (number of lacquer thinner rubbings/micron) | >5 | >5 | >5 | >5 | >5 | >5 |
| Resistance to soiling by tobacco tar (25° C. × 2 hrs., soap solution washing) | ◎ | ◎ | ◎ | ◎ | ◎ | ◎ |
| Lipstick (25° C. × 2 hrs., soap solution washing) | ◎ | ◎ | ◎ | ◎ | ◎ | ◎ |
| Ink of the felt pen (25° C. × 2 hrs., wiping with solvent) | ◎ | ◎ | ◎ | ◎ | ◎ | ◎ |
| Water repellency | ◎ | ◎ | ◎ | ◎ | ◎ | ◎ |
| Gasoline resistance (immersion for 2 hours in high-octane gasoline) | ◎ | ◎ | ◎ | ◎ | ◎ | ◎ |
| Weatherability (gloss retention %) Sunshine Weatherometer (3,000 hrs.) | 94 | 91 | 93 | 91 | 89 | 90 |
| Outdoor exposure (3 years at Miyazaki, Japan) | 91 | 90 | 92 | 89 | 88 | 89 |

What is claimed is:

1. A fluoroolefin copolymer having a hydroxyl value of 20 to 200 mg KOH/g and an inherent viscosity of from 0.05 to 2.0 dl/g obtained by copolymerizing
(I) 10 to 70 mole % of a fluoroolefin represented by the general formula

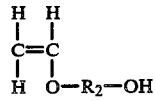

wherein X is H, Cl, F, $CF_3$, $OCF_3$ or $OC_3F_7$,
(II) 5 to 60 mole % of a vinyl carboxylate represented by the general formula

wherein $R_1$ represents an aliphatic, aromatic or alicyclic hydrocarbon group having 1 to 17 carbon atoms,
(III) 5 to 70 mole % of an alkyl vinyl either having an alkyl group with 1 to 8 carbon atoms, and
(IV) up to 30 mole % of a hydroxyl-containing vinyl ether represented by the general formula

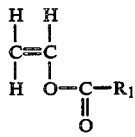

wherein $R_2$ represents an alkylene group having 1 to 6 carbon atoms.

2. The copolymer of claim 1 wherein the fluoroolefin is tetrafluoroethylene.

3. The copolymer of claim 1 wherein the fluoroolefin is chlorotrifluoroethylene.

4. The copolymer of claim 1 wherein the fluoroolefin is hexafluoropropylene.

5. The copolymer of claim 1 wherein the vinyl carboxylate is a vinyl ester of a carboxylic acid having 9 to 10 carbon atoms.

6. The copolymer of claim 1 wherein the vinyl carboxylate is vinyl benzoate.

7. The copolymer of claim 1 which contains 5 to 30 mole % of the hydroxyl-containing vinyl ether (IV), and has a hydroxyl value of 20 to 200 mg KOH/g.

8. The copolymer of claim 1 which contains 7 to 20 mole % of the hydroxyl-containing vinyl ether (IV) and has a hydroxyl value of 30 to 120 mg KOH/g and an inherent viscosity of 0.2 to 1 dl/g.

9. A process for producing a fluoroolefin copolymer having a hydroxyl value of 20 to 200 mg KOH/g and an inherent viscosity of from 0.05 to 2.0 dl/g, which comprises polymerizing 10 to 70 mole % of a fluoroolefin represented by the general formula

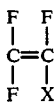

wherein X is H, Cl, F, CF$_3$ OCF$_3$ or OC$_3$F$_7$, 5 to 60 mole % of a vinyl carboxylate represented by the general formula

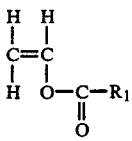

wherein R$_1$ represents an aliphatic, aromatic or alicyclic hydrocarbon group having 1 to 17 carbon atoms, 5 to 70 mole % of an alkyl vinyl ether having an alkyl group with 1 to 8 carbon atoms, and up to 30 mole % of a hydroxyl-containing vinyl ether represented by the general formula

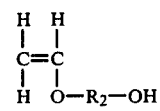

wherein R$_2$ represents an alkylene group having 1 to 6 carbon atoms.

10. The process of claim 9 wherein polymerization takes place in the presence of a radical initiator having a moderate decomposition speed at the polymerization reaction temperature and being present in an amount of 0.01 to 10% by weight based on the total weight of the monomers.

11. The process of claim 9 wherein polymerization is carried out at a temperature of from −20° C. to 130° C. and a pressure of 1 to 100 kg/cm$^2$.

* * * * *